Jan. 17, 1961

E. MITTELMANN 2,968,181

LIQUID QUANTITY MEASURING APPARATUS

Filed May 28, 1956

138

60

S 1

S 2

S 3

S 4

0

30

60

TIME IN SECONDS

INVENTOR
EUGENE MITTELMANN

BY Francis A. Sirr

ATTORNEY

United States Patent Office
2,968,181
Patented Jan. 17, 1961

2,968,181

LIQUID QUANTITY MEASURING APPARATUS

Eugene Mittelmann, Chicago, Ill., assignor to Minneapolis-Honeywell Regulator Company, Minneapolis, Minn., a corporation of Delaware Filed May 28, 1956, Ser. No. 587,710

14 Claims. (Cl. 73—304)

The present invention is concerned with an improved measuring apparatus and particularly with an improved liquid quantity measuring apparatus.

The present invention employs a capacitance type liquid quantity sensor which is arranged to be positioned in a container of liquid and which has a capacitance value which varies as a function of the dielectric constant and the quantity of liquid in the container. A reference capacitor is also utilized and the basic operating principle of the present invention is based on the transfer of electrical charge from this reference capacitor to the liquid quantity sensor. If a capacitor, preferably a small capacitor, is charged from a source of voltage and this charge is then deposited upon a larger capacitor, the larger capacitor will be charged to a potential which bears a relationship to the ratio of the small and larger capacitor and to the magnitude of the charging source of voltage. If the small capacitor is charged repeatedly by the same voltage source and then periodically discharged into the larger capacitor, the charge deposited on the larger capacitor, and thereby the voltage on the larger capacitor, is a definite and accurate function of the ratio of the two capacitors.

In the present invention, the above mentioned larger capacitor is the liquid quantity sensor whose capacitance is a function of the quantity of liquid. Therefore, by measuring the time period of cyclic operation of charging the small capacitor and discharging it into the larger capacitor, the liquid quantity can be determined.

It is an object of the present invention to provide a liquid quantity measuring apparatus wherein a capacitance type liquid quantity sensor is cyclically charged from a reference capacitor which in turn is charged from a source of voltage. The voltage on the liquid quantity sensor is compared to at least a portion of the voltage source, and means are provided to indicate the quantity of liquid in accordance with the number of times the reference capacitor must be discharged into the sensing capacitor in order to raise the voltage of the sensing capacitor to a predetermined value.

It is a further object of the present invention to provide a measuring apparatus wherein a reference capacitor is cyclically charged from a source of voltage and then discharged into a capacitance type liquid quantity sensor and wherein means are provided to sense the number of such cyclic operations necessary to raise the voltage on the capacitance type liquid quantity sensor to a predetermined magnitude.

It is a further object of the present invention to provide an improved liquid quantity measuring apparatus having capacitance type liquid quantity sensing means arranged to be located in a container of liquid the quantity of which is to be measured, having a reference capacitor whose dielectric is the liquid to be measured, and having a direct current source of voltage with cycling means to first charge the reference capacitor from the direct current source of voltage and to then discharge the reference capacitor into the liquid quantity sensing means, with means responsive to the voltage on the liquid quantity sensing means.

These and other objects of the present invention will be apparent to those skilled in the art upon reference to the following specification, claims, and drawings, of which:

Figure 1 is a schematic showing of the present invention,

Figures 2, 3:
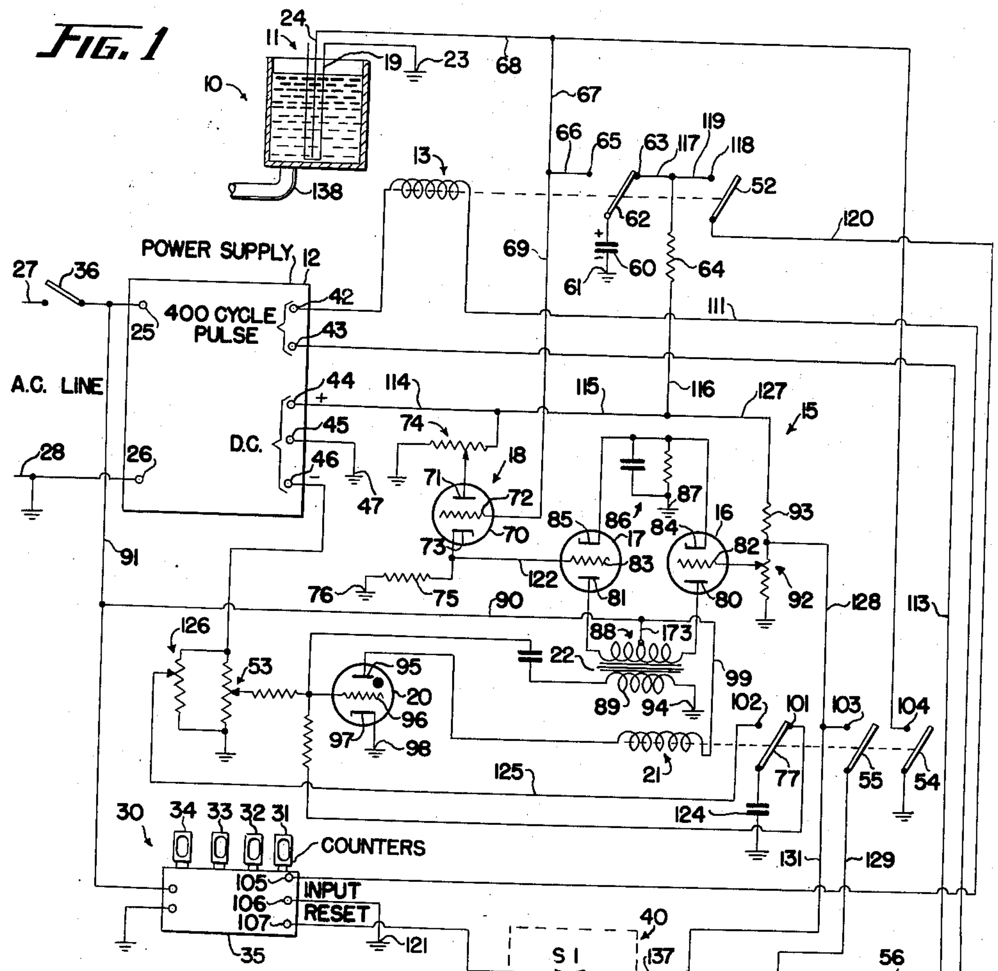
Figure 2 is a bar graph showing the sequence of operation of the switches of the motor driven timer of Figure 1.
Figure 3 is a showing of a modification of Figure 1 wherein the reference capacitor of Figure 1 is placed to have the liquid whose quantity is being measured as the dielectric thereof.

Referring to Figure 1, the reference numeral 10 designates a container of liquid, which may be the fuel tank of an aircraft, having an outlet conduit 138. The reference numeral 11 designates capacitance type liquid quantity sensing means in the form of a capacitor. This liquid quantity sensor includes a first capacitor electrode 19, which is connected to ground at ground connection 23, and a second capacitor electrode 24. The electrodes 19 and 24 have air as dielectric in the portion above the liquid, and have liquid as dielectric in the remaining portion.

Power is supplied to the apparatus of Figure 1 from a power supply 12. Power supply 12 has a pair of input terminals 25 and 26 which are connected to a pair of power line conductors 27 and 28 through a master switch 36. The power line conductors 27 and 28 are connected to an alternating current source of voltage, which may be the 400 cycle alternating voltage provided in aircraft.

The general construction of power supply 12 may take a variety of forms and for this reason it has been shown in block diagram form in Figure 1. The output of the power supply 12 appears at the terminals 42, 43, 44, 45, and 46. The voltage between the terminals 42 and 43 is a 400 cycle pulse voltage. The voltage present at the terminals 44, 45, and 46 is a direct current voltage. The terminal 45 is connected to ground at ground connection 47 and the voltage on terminal 44 is positive with respect thereto while the voltage on terminal 46 is negative with respect thereto, as is shown in Figure 1.

A reference capacitor is designated by the reference numeral 60 and this capacitor has one electrode thereof connected to ground potential at ground connection 61. The other electrode of capacitor 60 is connected to switch blade 62 of relay 13. In the de-energized position of relay 13, the switch blade 62 engages a contact 63 and is connected through a resistor 64 to the positive terminal 44 of the power supply 12. In the energized position of relay 13, the switch blade 62 engages a contact 65 and is thereby connected through conductors 66, 67 and 68 to the electrode 24 of capacitor 11.

Relay 13 is a fast acting relay and is capable of responding to the 400 cycle pulse at terminals 42 and 43. As will be seen, relay 13 functions as a cycling switch means which cyclically connects capacitor 60 to a source of voltage and then connects the charged capacitor 60 to capacitor 11.

The inner electrode 24 of capacitor 11 is also connected by means of conductors 68, 67 and 69 to a cathode follower circuit designated generally by the reference numeral 18. The cathode follower circuit includes a discharge device 70 having an anode 71, a control electrode 72, and a cathode 73. Anode 71 is connected through a potentiometer 74 to the direct current voltage terminal 44 of power supply 12. The cathode 73 of discharge device 70 is connected through a resistor 75 to ground potential at ground connection 76.

The output of cathode follower 18, that is the cathode 73, is connected to a comparison means designated generally by the reference numeral 15. This comparison means includes a first electron discharge device 16 and a second electron discharge device 17. Electron discharge devices 16 and 17 are triodes and include anodes 80 and 81, control electrodes 82 and 83, and cathodes 84 and 85. The cathodes 84 and 85 of the discharge devices 16 and 17 are connected through a parallel capacitor and resistor circuit 86 to ground potential at the ground connection 87. The anodes 80 and 81 of the discharge devices 16 and 17 are connected to the end terminals of a tapped primary winding 88 of transformer 22 having a secondary winding 89. The tap of the primary winding 88 is connected by means of conductors 173, 90 and 91 to the power line conductor 27.

From the structure of Figure 1 thus far described, it can be seen that the conduction of electron discharge device 17 is controlled in accordance with the signal received on the control grid 72 of cathode follower 18, which signal is received from the capacitance type liquid quantity sensor 11. Conduction of the discharge device 16 is controlled by the setting of a potentiometer 92 whose resistance element is connected through a resistor 93 and conductors 127, 115 and 114 to the positive terminal 44 of the power supply 12. It will be noted that a variation of the voltage present on power supply terminal 44 will have an effect on the conduction of discharge device 16. However, this change will also have an effect on the voltage of capacitor 11 and thereby the conduction of discharge device 17. These two effects tend to cancel out in primary winding 88 of transformer 22.

The voltage applied to the anodes 80 and 81 of the discharge devices 16 and 17 is an alternating voltage. Thus, discharge devices 16 and 17 are capable of conduction on the half cycle of the alternating voltage source in which conductor 27 is positive with respect to conductor 28. For purposes of illustration, this will be called the positive half cycle of the alternating voltage source.

When the ampere turns, due to conduction of discharge devices 16 and 17, are of equal magnitude, there is no voltage induced in the secondary winding 89 of transformer 22. However, when the ampere turns, due to conduction of discharge devices 16 and 17, are not equal, a voltage is induced in the secondary winding 89. One end terminal of secondary winding 89 is connected to ground at ground connection 94 and the relationship of winding 89 to the primary winding 88 is such that when the ampere turns, due to conduction of discharge device 17, are less than the ampere turns due to conduction of discharge device 16, a negative voltage with respect to ground potential appears at the left-hand end of secondary winding 89 and this negative voltage exists during the positive half cycle of the alternating voltage source. This voltage is the output voltage of the comparison means 15 and is coupled to further circuit means including a gas filled discharge device 20.

Discharge device 20 includes an anode 95, a control electrode 96, and a cathode 97. Cathode 97 is connected to ground potential at ground connection 98. Anode 95 of discharge device 20 is connected to the winding of a relay 21 and thereby through conductors 99, 91 and 90 to the power line conductor 27. From this it can be seen that discharge device 20 likewise is capable of conducting during the positive half cycle of the alternating voltage source. A portion of the voltage on control electrode 96 is derived from a potentiometer 53 which is connected to the negative terminal 46 of the power supply 12. The negative voltage applied to control electrode 96 from potentiometer 53 does not render discharge device 20 nonconductive but establishes the operating point of the circuit. However, when a negative voltage is applied to the control electrode 96 from the output of the comparison means 15, that is from the secondary winding 89 of transformer 22, the discharge device 20 is rendered nonconductive. Relay 21 controls the position of switch blades 77, 55 and 54. In Figure 1, the switch blades 77, 55 and 54 are shown with the relay winding in the de-energize condition. Upon energization of the relay winding, switch blade 77 disengages contact 101 and moves into engagement with contact 102 while the switch blades 55 and 54 move into engagement with the contacts 103 and 104 respectively.

Referring now to the indication of the apparatus of Figure 1, numeral 30 designates an indicator means of a counter type having a digital display. This counter may take a variety of forms and the particular counter shown in Figure 1 includes a power supply 35 and a plurality of Berkeley counters models 700A designated by the reference numerals 31, 32, 33 and 34. The general operation of such a counter is that each time an input pulse of voltage is applied to input terminals 105 and 106 the counter numbered 31 counts one digit. Upon the counter 31 counting to nine, the next input pulse at input terminals 105 and 106 resets counter 31 to zero and indicates a count of one on the counter 32, thereby indicating a total count of ten. Counter 31 counts units, the counter 32 counts tens, the counter 33 counts hundreds, and the counter 34 counts thousands. When a reset pulse is applied to the reset terminal 107, all of the counters 31 through 34 are reset to zero.

The reference numeral 40 designates a motor driven timer having a motor represented by winding 41 and having switches S1, S2, S3 and S4 controlled in the manner shown in the bar graph of Figure 2. The time period of a single cycle of the timer can be of any divided length and has been chosen as 60 seconds.

The reference numeral 50 designates a relay having movable switch blades 57, 56 and 51. Relay 50 is shown in the position it assumes when its winding is de-energized. Upon energization thereof the movable switch blade 51 disengages contact 108 while the switch blades 56 and 57 move into engagement with the contacts 109 and 110 respectively.

The operation of the improved liquid quantity measuring apparatus of Figure 1 will now be described. The apparatus of Figure 1 is shown in its de-energized position, that is with the master switch 36 open. Upon closing of the master switch 36, alternating voltage is applied to the power supply 12, the anodes of discharge devices 16, 17 and 20, and to the counter 30. The heaters, not shown, for the cathodes of discharge devices 16, 17, 18 and 20 are likewise energized from the source of voltage.

Energization of the terminals 25 and 26 of power supply 12 causes a direct current voltage to appear at the terminals 44, 45 and 46 and also causes a 400 cycle pulse of voltage to appear at the terminals 42 and 43. This 400 cycle pulse of voltage at terminals 42 and 43 causes relay 13 to be cycled at a rate of 400 cycles per second and to cyclically operate the switch means including switch blades 52 and 62. The energizing circuit for the winding of relay 13 can be traced from terminal 42 through relay 13, conductor 111, timer switch S4, conductor 112, switch blade 51 and contact 108, and conductor 113 to terminal 43. It will be noted that in order for this circuit to be closed the switch of S4 of timer 40 must be closed and relay 50 must be in its de-energized condition.

As relay 13 is cyclically energized and de-energized due to the 400 cycle pulse at terminals 42 and 43, switch blades 52 and 62 move between a first or de-energized and a second or energized position.

Considering first switch blade 62, in the de-energized condition switch blade 62 completes a circuit from the positive terminal 44 through conductors 114, 115 and 116, resistor 64, conductor 117, contact 63 and switch blade 62, reference capacitor 60, and ground connections 61 and 47 to terminal 45. This causes capacitor 60 to be charged to the polarity of voltage indicated on Figure 1. In the energized position of switch blade 62, capacitor 60, now in a charged state, is connected to the measuring capacitor 11. This circuit can be traced from ground connection 61 through capacitor 60, switch blade 62 and contact 65, conductors 66, 67 and 68, and capacitor 11 to ground connection 23. This above traced circuit causes the electrical charge stored in capacitor 60 to be distributed to capacitor 11.

It is known that if a small capacitor, say capacitor 60, is charged to a given potential and this charge is then deposited onto a larger capacitor, say capacitor 11, the large capacitor will be charged to a potential which is a function of the ratio of the small capacitor to the large capacitor. In the apparatus of Figure 1 the capacitance of capacitor 60 and the voltage of terminal 44 are constant. The capacitance of capacitor 11 is variable and is indicative of the height and dielectric constant of the liquid within the container 10. At any given instant the voltage on capacitor 11 is a function of its capacitance value and of the total charge which has been distributed thereto from capacitor 60. This particular voltage is supplied to the control electrode 72 of discharge device 18, as will be described.

Considering now the operation of switch blade 52 of relay 13, when switch blade 52 moves to its energized position it engages contact 118. This completes a circuit to the input terminals 105 and 106 of the counter 30. This circuit can be traced from power supply terminal 44 through conductors 114, 115, and 116, resistor 64, conductor 119, contact 118 and switch blade 52, conductor 120, input terminals 105 and 106, and ground connections 121 and 47 to terminal 45. As has been described, this voltage applied to the input terminals 105 and 106 of the counter 30 causes the unit counter 31 to register a count of 1. As relay 13 continues to cycle a pulse of voltage will be applied to the input terminals 105 and 106 each time that relay 13 is energized and the counters 31 through 34 will register the total number of cycles.

The voltage on capacitor 11, which increases as relay 13 cycles, is applied to the control grid 72 of the cathode follower 18 as above described. The voltage developed across resistor 75, that is the output of cathode follower 18, is indicative of the voltage present on capacitor 11.

The output voltage of cathode follower 18 is applied to the control grid 83 of discharge device 17 through a conductor 122. Discharge device 17 is a portion of the comparison means 15. This comparison means is essentially a balance type electronic amplifier system with a tapped output transformer between the plates of the balanced amplifier. Discharge device 16 and discharge device 17 form the pair of electron discharge devices in this balanced amplifier system. The anodes 80 and 81 of the discharge devices 16 and 17 respectively are each connected through a portion of the primary winding 88 of output transformer 22 and then by means of conductors 173, 90, and 91 to the power line conductor 27. This places a 400 cycle alternating voltage on the anodes 80 and 81 rendering these discharge devices 16 and 17 conductive at the same time in the alternating current cycle, which has been designated the positive half cycle.

The discharge devices 16 and 17 pass a pulsating current since the voltage on the respective anodes is an alternating voltage. So long as the ampere turns in the primary 88 of output transformer 22 which are produced by the current flowing through discharge device 17 are less than the ampere turns produced by the current flowing through the discharge device 16, an alternating voltage is induced in the secondary winding 89. With the condition as specified, the voltage induced in the secondary winding 89 is such as to render the left-hand terminal negative and the grounded right-hand terminal positive during the positive half cycle of the alternating voltage source 27—28. When the ampere turns produced by the discharge device 17 becomes equal to the ampere turns produced by the discharge device 16, no voltage appears in the secondary winding 89.

As has been described, the voltage induced in the secondary winding 89 is effective to control the bias of discharge device 20, which discharge device is biased to cut-off when a negative voltage appears at the left hand end of secondary winding during the positive half cycle of the alternating voltage source.

As cycling relay 13 continues to operate, the voltage on capacitor 11 continues to build up. The rate at which this voltage builds up is determined by the capacitance value of capacitor 11 and this in turn is determined by the quantity of liquid in the container 10. As this voltage builds up, the cathode follower circuit 18 conducts more and more current and this in turn causes the discharge device 17 in the comparison means 15 to conduct more current. When the point is reached where the secondary voltage in secondary winding 89 is appreciably reduced, the discharge device 20 is rendered conductive to energize relay 21. Energization of relay 21 causes movable switch blades 54, 55 and 77 to move to their energized condition. Movable switch blade 77 in moving to its energized condition disengages contact 101 and moves into engagement with contact 102. This establishes a charging circuit for a capacitor 124 through a circuit including conductor 125 and potentiometer 126. By means of this circuit, capacitor 124 is charged so that its upper plate is negative with respect to ground potential.

Movable switch blade 55 in moving to its energized position engages contact 103 and establishes an energizing circuit for relay 50. This energizing circuit can be seen by tracing a circuit from the positive terminal 44 of power supply 12 through conductors 114, 115, 127, resistor 93, conductor 128, contact 103 and switch blades 55, conductor 129, relay 50, timer switch S2, and ground connections 130 and 47 to terminal 45.

Energization of relay 50 causes its movable switch blades 51, 56 and 57 to move from the de-energized to the energized position. Considering for the moment the operation of switch blade 57, this switch blade in its energized position engages contact 110 and establishes a holding circuit for relay 50 which is independent of switch blade 55 controlled by relay 21. This holding circuit can be seen by tracing a circuit from terminal 44 through conductors 114, 115, and 127, resistor 93, conductors 128, 131, 132 and 133, switch blade 57 and contact 110, relay 50, switch S2, and ground connections 130 and 47 to terminal 45. From this circuit it can be seen that once relay 50 is energized by energization of relay 21 it remains energized until the motor driven timer has operated to where the point S2 is open, as can be seen in Figure 2.

Energization of relay 50 also causes switch blade 56 to move to its energized position. This completes an energizing circuit for motor 41 which can be traced from power supply terminal 44 through conductors 114, 115 and 127, resistor 93, conductors 128, 131, 132 and 134, motor 41, conductor 135, contact 109 and switch blade 56 and ground connections 136 and 47 to power supply terminal 45.

Energizing of relay 50 also causes switch blade 51 to move to its energized position thereby disengaging contact 108. Switch blade 51 and contact 108 lie in the energizing circuit for the cycling relay 13, above traced. The cycling relay 13 therefore ceases its cycling action and remains in its de-energized position as shown in Figure 1.

Referring now to the operation of switch blade 54 of relay 21, this switch blade in engaging contact 104 shorts capacitor 11 and discharges this capacitor. This action causes the voltage to disappear at the control electrode 72 of cathode follower 18. This in turn causes the voltage to reappear in the secondary winding 89 of output transformer 22 associated with the comparison means 15. Discharge device 20 therefore again becomes nonconductive and relay 21 is de-energized. However, cycling relay 13 remains inoperative due to the fact that relay 50 remains energized through its holding circuit.

The count now maintained on the counters of counter 30 is indicative of the quantity of liquid in the container 10. This count will be maintained until a reset pulse is applied to the terminal 107 of counter 30.

It will be remembered that the motor 41 of timer 40 is now energized. The first contact to be actuated is switch S3 which is closed. The closing of switch S3 completes a holding circuit for the motor 41 which is independent of the switch blade 56 of relay 50.

The next switch to be actuated is switch S4 which moves to the open condition. This switch insures that the cycling relay 13 may not be re-energized even though the relay 50 is de-energized, as will be explained.

The next timer switch to be actuated is switch S1 and this switch is moved to its closed position. This applies a reset pulse to the reset terminal 107 of counter 30. The circuit for this reset pulse can be traced from power supply terminal 44 through conductors 114, 115 and 127, resistor 93, conductors 128, 131 and 137, switch S1, terminals 107 and 106, and ground connections 121 and 47 to power supply terminal 45. The above traced circuit causes the counters 31 through 34 to be reset to their zero condition and therefore places counter 30 in a condition for the next counting period.

At this time switch S2 is opened. The opening of switch S2 de-energizes relay 50 causing its switch blades to move to the de-energized position as shown in Figure 1.

A short time thereafter switch S2 again closes. However, relay 50 remains de-energized since its initial energizing circuit is open at switch blade 55 controlled by relay 21 and its holding circuit is open at switch blade 57 controlled by relay 50.

Switch S1 now opens to remove the reset pulse of voltage from the timer 30.

The next switch to be actuated is switch S4 which is moved to the closed condition. This once again completes the energizing circuit for cycling relay 13 and this relay is effective to cycle between the energized and de-energized positions in accordance with the 400 cycle pulse applied to the terminals 42 and 43 to thereby cause capacitor 60 to be alternately charged from power supply terminal 44 and then discharged into capacitor 11, the voltage on capacitor 11 being a function of the dielectric constant of the liquid in the container 10 and the amount of charge transferred thereto from the capacitor 60.

At the end of the timing cycle of the timer 40 the switch S3 is opened to de-energize the motor 41.

The above described operation has traced a complete cycle of operation of the apparatus in Figure 1 wherein the counter 30 has been effective to count the number of operations of the cycling relay 13 necessary to build up the voltage on capacitor 11 to a predetermined value and to display this count as a digital representation of the quantity of liquid in the container 10. This operation continues with the counter 30 having its total count built up to indicate the quantity of liquid in the container 10 and then to be reset to zero in preparation for another count so long as the master switch 36 is closed.

It will be remembered that the capacitance of the capacitor 11 is affected not only by the height of liquid in the container 10 but also by the dielectric constant of this liquid. It is recognized that this dielectric constant may change and introduce an erroneous reading of the actual quantity of liquid in the container. To compensate for such a change in dielectric constant, a modification of the apparatus of Figure 1 may be made such as shown in Figure 3. This modification consists of placing the capacitor 60 in the liquid whose quantity is to be measured, for example in outlet conduit 138, so that its capacitance is a function of the dielectric constant of the liquid but does not vary as the height of the liquid varies in the container 10. With this modification, a change in the dielectric constant of the liquid will change the capacitance value of both capacitor 60 and 11 and such a change will tend to be cancelled out in the operation of the apparatus.

These and other modifications of the present invention will be apparent to those skilled in the art and it is intended that the scope of the present invention be limited solely to the scope of the appended claims.

I claim as my invention:

1. Condition responsive apparatus comprising; capacitance type condition sensing means the capacitance of which changes with changes in the condition sensed, a reference capacitor, a source of charging voltage, cycling switch means, means controlled by said cycling switch means arranged to alternately connect said reference capacitor to said source of voltage and then to disconnect said reference capacitor from said source of voltage and connect it to said sensing means to thereby cause said reference capacitor to be alternately charged from said source of voltage and then discharged into said sensing means, the voltage on said sensing means at any given time being a function of its capacitance value and of the total charge transferred thereto from said reference capacitor, voltage responsive means, means connecting said voltage responsive means to said sensing means to be controlled in accordance with the voltage thereon, and means including said voltage responsive means connected in controlling relation to said switch means to prevent effective operation of said cycling switch means when the voltage on said sensing means has reached a predetermined value indicative of the condition sensed.

2. Condition sensing apparatus comprising; a capacitance type condition sensor having a capacitance value indicative of the condition to be sensed, a reference capacitor, a source of voltage, cycling switch means, means controlled by said cycling switch means connecting said reference capacitor to said source of voltage to thereby charge said reference capacitor and then disconnecting said reference capacitor from said source of voltage and then connecting said reference capacitor to said sensor to discharge said reference capacitor into said sensor, the voltage on said sensor at any one time being a direct function of the capacitance value of said sensor and of the number of times said reference capacitor has been discharged into said sensor, voltage responsive comparison means, means connecting said comparison means to said sensor and to said voltage source to compare the voltages thereof, means connecting said comparison unit to control operation of said cycling switch means, said cycling switch means being continuously cyclically operable to charge said reference capacitor and discharge said reference capacitor into said sensor so long as the voltage on said sensor is below a given value, and means controlled by said cyclic switch means in accordance with the time period of energization of said cyclic switch means necessary to cause the voltage on said sensor to reach said given value.

3. Condition indicating means comprising; capacitance type condition sensing means arranged to have a capacitance value indicative of a condition, a reference capacitor, a source of voltage, switch means having a first and a second position, means controlled by switch means in said first position connecting said reference capacitor to said source of voltage to thereby charge said reference capacitor, means controlled by said switching means in said second position disconnecting said reference capacitor from said source of voltage and connecting said reference capacitor to said sensing means to thereby transfer at least a portion of the charge of said reference capacitor to said sensing means; a pair of electron discharge devices each having a control electrode, means connecting the control electrode of one of said discharge devices to a source of direct current voltage to cause a substantially uniform current flow through said one discharge device, means connecting the control electrode of the other discharge device to said sensing means to thereby control the current flow through said other discharge device in accordance with the voltage on said sensing means, current responsive means connected to said pair of discharge devices and comparing the currents flowing therethrough, means connecting said last named means in controlling relation to said switch means to cause said switch means to cycle between said first and second position so long as the current flow through said other discharge device is below a given magnitude with respect to the substantially constant current flowing through said one discharge device, and indicating means controlled by said switch means and responsive to the number of cycles of said switch means necessary to establish a charge on said sensing means sufficient to cause the current flow through said other discharge device to be of said given magnitude.

4. A liquid quantity responsive system comprising; capacitance type liquid quantity measuring means, reference capacitance means, a source of voltage, cyclically operable switch means, means controlled by said switch means cyclically connecting said reference capacitance means to said source of voltage to thereby charge said reference capacitance means and then disconnecting said reference capacitance means from said source of voltage and connecting said reference capacitance means to said capacitance type liquid quantity measuring means, the voltage present on said liquid quantity measuring means at any given time being a function of the capacitance value of said liquid quantity measuring means and the total charge transferred thereto from said reference capacitance means, voltage responsive comparison means, means connecting said comparison means to said liquid quantity measuring means and to said voltage source to compare the voltage of said voltage source or a fraction thereof with the voltage on said liquid quantity measuring means, means connecting said switch means to be controlled by said comparison means to stop the cycling of said switch means when the voltage on said liquid quantity measuring means bears a predetermined relationship to the voltage of said voltage source, and means controlled in accordance with the time period of operation of said cycling switch means necessary to cause said predetermined relationship to exist.

5. A liquid quantity responsive system for use with a liquid tank comprising; a liquid quantity measuring capacitor arranged to be positioned in the liquid tank and to have a capacitance value indicative of the quantity of liquid in the tank, a reference capacitor, a source of voltage, cycling switch means, means including said cycling switch means in a first position connecting said reference capacitor to be charged from said source of voltage, means including said cycling switch means in a second position disconnecting said reference capacitor from said source of voltage and connecting said reference capacitor to said measuring capacitor to thereby transfer at least a portion of the charge on said reference capacitor to said measuring capacitor, voltage responsive comparison means, means connecting said voltage responsive comparison means to said measuring capacitor and to said source of voltage to thereby compare the voltage on said measuring capacitor with at least a portion of the voltage of said voltage source, means connecting said cycling switch means to be controlled by said comparison means to cause said cycling switch means to continuously cycle between the first and second position so long as the voltage on said measuring capacitor does not bear a given relationship to the said portion of the voltage of said voltage source, and means controlled by said cycling switch means and responsive to the time period of operation of said cycling switch means necessary to cause the voltage on said measuring capacitor to bear said given relationship to said portion of the voltage of said voltage source to indicate the quantity of liquid in the liquid tank.

6. Liquid quantity responsive apparatus for use with a liquid container comprising; a measuring capacitor arranged to be positioned in the container and to have a capacitance value indicative of the quantity of liquid in the container, a reference capacitor, a source of direct current voltage, switch means having a first and a second position, means controlled by said switch means in said first position connecting said reference capacitor to said source of direct current voltage to thereby charge said reference capacitor, means controlled by said switching means in said second position disconnecting said reference capacitor from said source of direct current voltage and connecting said measuring capacitor to said reference capacitor to thereby cause at least a portion of the charge on said reference capacitor to be distributed to said measuring capacitor, voltage responsive means connected in controlling relation to said switch means and connected to be controlled in accordance with the relative voltages of said measuring capacitor and said source of direct current voltage to cause said switch means to cycle between said first and second position so long as the voltage on said measuring capacitor is below a given magnitude, means controlled by said switch means and responsive to the time period of cycling of said switch means necessary to raise the voltage on said measuring capacitor to said given magnitude, and means controlled by said voltage responsive means to discharge said measuring capacitor upon the voltage thereon reaching said given magnitude.

7. Liquid quantity measuring apparatus for use with a liquid container comprising; capacitance type liquid quantity sensing means arranged to be positioned in the container, a reference capacitor, a source of direct current voltage, cycling switch means having a first and a second position, means including said cycling switch means in said first position connecting said reference capacitor to said direct current source of voltage to thereby charge said reference capacitor to a direct current potential, means including said cycling switch means in said second position disconnecting said reference capacitor from said direct current source and connecting said charged reference capacitor to said sensing means to thereby transfer at least a portion of the charge of said reference capacitor to said sensing means, the direct current voltage on said sensing means being a function of the capacitance of said sensing means and of the total charge transferred thereto from said reference capacitor as said cycling switch means cycles between said first and second positions, voltage responsive comparison means, means connecting said voltage responsive comparison means to said sensing means and to said source of direct current voltage to compare the voltage on said sensing means with at least a portion of the voltage of said direct current source of voltage, means connecting said cycling switch means to be controlled by said comparison means and to be continuously cycled so long as the voltage on said sensing means is below a given value, and a liquid quantity indicator controlled in accordance with the time period of energization of said cycling switch means necessary to cause the voltage on said sensing means to be of said given value.

8. Liquid quantity measuring apparatus for use with a liquid container comprising; capacitance type liquid quantity sensing means arranged to be positioned in the liquid container and to have a capacitance value indicative of the dielectric constant of the liquid and of the height of liquid in the container, a reference capacitor having a pair of capacitor plates and arranged so that the dielectric between the plates is the liquid whose quantity is to be measured, a source of voltage, cycling switch means, means controlled by said cycling switch means connecting said reference capacitor to said source of voltage to charge said reference capacitor and then disconnecting said reference capacitor from said source of voltage and connecting said reference capacitor to said sensing means to discharge said reference capacitor into said sensing means, the voltage on said sensing means at any given time being indicative of the capacitance value of said sensing means and of the total charge transferred thereto from said reference capacitor, voltage responsive comparison means, means connecting said comparison means to said sensing means and to said source of voltage to compare the voltages thereon, means connecting said comparison means in controlling relation to said cycling switch means, and indicator means controlled by said switching means.

9. Liquid quantity responsive apparatus for use with a liquid container comprising; capacitance type liquid quantity sensing means arranged to be positioned in the container and to have a capacitance value indicative of the quantity of liquid in the container and the dielectric constant of the liquid, reference capacitance means, a source of direct current voltage, cycling switch means, means controlled by said cycling switch means to alternately connect said reference capacitance means to said source of voltage to thereby charge said reference capacitance means and to then disconnect said reference capacitance from said source of voltage and to connect said reference capacitance means to said sensing means to thereby cause a charge to be distributed to said sensing means, voltage responsive means, means connecting said voltage responsive means to said sensing means, said voltage responsive means being responsive to a predetermined minimum voltage thereon, means controlled by said voltage responsive means to stop the cycling of said switch means upon the voltage on said sensing means reaching said predetermined minimum, and means controlled by said switch means in accordance with the quantity of liquid in the container.

10. The structure defined in claim 9 wherein said reference capacitance means comprises a pair of capacitor plates arranged to have the liquid as the dielectric thereof.

11. Liquid quantity measuring apparatus comprising; capacitance type liquid quantity sensing means, reference capacitance means, a source of direct current voltage, switch means having a first and a second position, means controlled by said switch means in said first position connecting said reference means to said direct current source of voltage to apply an electrical charge thereto, means controlled by said switch means in said second position disconnecting said reference means from said direct current source of voltage and connecting said reference means to said sensing means to discharge said reference means into said sensing means, the voltage on said sensing means being indicative of the capacitance value of said sensing means and of the total charge transferred thereto from said reference means; a pair of electron discharge devices each having an anode, a cathode, and a control electrode; a transformer having a tapped primary winding and having a secondary winding, a source of alternating current voltage, means connecting the tap of said primary winding to said source of alternating current voltage, means connecting the end terminals of said primary winding to the anodes of said pair of discharge devices to thereby apply an alternating current voltage to each of the anodes to render said discharge devices simultaneously conductive in accordance with the voltage applied to their control electrodes, means connecting the control electrode of one of said discharge devices to a substantially constant source of voltage to thereby cause a substantially constant magnitude of current to flow between its anode and cathode, means connecting the control electrode of the other of said discharge devices to said sensing means to thereby control the current flow between its anode and cathode in accordance with the voltage on said sensing means, said transformer secondary winding having a voltage induced therein whenever the magnitude of current flow through said other discharge does not bear a predetermined relationship to the magnitude of current flow through said one discharge device; a further electron discharge device having a cathode, an anode and a control electrode; means connecting the secondary of said transformer to the control electrode of said further discharge device to vary the bias thereon and thereby render said further discharge device nonconductive when a voltage of a predetermined magnitude is induced in the secondary of said transformer, a relay having a winding and switch means controlled thereby, means connecting said relay winding to the anode of said further discharge device to cause said relay winding to be energized upon said further discharge device being rendered conductive, means controlled by said relay switch means to discontinue operation of said cycling switch means upon said relay winding being energized, and further means controlled by said relay switch means to discharge said sensing means upon said relay winding being energized.

12. Apparatus for measuring a condition comprising: a reference capacitor; a sensing capacitor whose capacitance is determined by the condition; a source of voltage; means repeatedly first connecting said reference capacitor to said source of voltage and then disconnecting said reference capacitor from said source of voltage and connecting said reference capacitor to said sensing capacitor to build up a voltage on said sensing capacitor; and means counting the number of times said reference capacitor must be connected to said sensing capacitor to build up a predetermined voltage on said sensing capacitor.

13. Apparatus for measuring a condition comprising, in combination: energy storing means; a capacitor whose capacitance is determined by the condition to be measured; a source of electrical energy; means repeatedly first connecting said energy storing means to said source and then disconnecting said energy storing means from said source and connecting said energy storing means to said capacitor to first bring said energy storing means to a standard level and then to transfer a portion of that energy to said capacitor to build up a voltage thereon; and means counting the number of times said energy storing means must be connected to said capacitor to build up a predetermined voltage on said capacitor.

14. Apparatus for measuring a condition comprising, in combination: a sensing capacitor whose capacitance is determined by the condition being measured; means building up the voltage on said sensing capacitor to a predetermined value, said means including a source of electrical energy, an energy storing device and switch means which operates repeatedly to first connect the storing device to the source to bring the storing device to a standard energy level and second to disconnect the storing device from said source and to connect the storing device to said sensing capacitor to transfer a portion of the energy from said storing device to said sensing capacitor; counting means counting the number of operations of the switch means; and means connected to said sensing capacitor to monitor the voltage thereon and to stop said counting means when the voltage on said sensing capacitor has reached the predetermined value.

References Cited in the file of this patent

UNITED STATES PATENTS

| | | |
|---|---|---|
| Re. 23,493 | Edelman | May 20, 1952 |
| 1,783,234 | Firestone | Dec. 2, 1930 |
| 2,078,792 | Fitzgerald | Apr. 27, 1937 |
| 2,114,016 | Dimond | Apr. 12, 1938 |
| 2,346,838 | Haight | Apr. 18, 1944 |
| 2,455,543 | Williams | Dec. 7, 1948 |
| 2,761,968 | Kuder | Sept. 4, 1956 |